US012277817B2

(12) United States Patent
Delgado Acarreta et al.

(10) Patent No.: US 12,277,817 B2
(45) Date of Patent: Apr. 15, 2025

(54) SAFETY SYSTEMS FOR OBJECTS AND METHODS

(71) Applicant: RADE TECNOLOGÍAS S.L., Saragossa (ES)

(72) Inventors: Raúl Delgado Acarreta, Saragossa (ES); José Cuesta Álvarez, Saragossa (ES); Daniel Vicente Dueñas, Saragossa (ES)

(73) Assignee: RADE TECNOLOGÍAS S.L., Saragossa (ES)

( * ) Notice: Subject to any disclaimer, the term of this patent is extended or adjusted under 35 U.S.C. 154(b) by 132 days.

(21) Appl. No.: 18/083,837

(22) Filed: Dec. 19, 2022

(65) Prior Publication Data

US 2023/0196856 A1   Jun. 22, 2023

(30) Foreign Application Priority Data

Dec. 17, 2021   (EP) .................................... 21383158

(51) Int. Cl.
*G07C 9/00* (2020.01)
*F41A 17/06* (2006.01)
(Continued)

(52) U.S. Cl.
CPC ........ *G07C 9/00182* (2013.01); *F41A 17/063* (2013.01); *F41C 33/029* (2013.01);
(Continued)

(58) Field of Classification Search
CPC ........ G07C 9/00182; G07C 2009/0019; G07C 2009/00261; G07C 9/00309; G07C 2209/65; F41A 17/063; G01D 5/2405
See application file for complete search history.

(56) References Cited

U.S. PATENT DOCUMENTS 6,861,944 B1 * 3/2005 Hoepelman ............. F41B 11/57
235/382
2015/0280455 A1 * 10/2015 Bosshard .............. B60L 53/122
307/104
(Continued)

FOREIGN PATENT DOCUMENTS

WO   2009098631 A1   8/2009
WO   2011072682 A1   6/2011
(Continued)

OTHER PUBLICATIONS

Extended European Search report for related patent application EP 21383158.9 issued by the European Patent Office and dated Sep. 29, 2022, 7 pgs. in English.
(Continued)

*Primary Examiner* — Vernal U Brown
(74) *Attorney, Agent, or Firm* — Hassan Abbas Shakir; Shakir Law PLLC

(57) ABSTRACT

A safety system for an object having a transmitter that comprises a microcontroller to generate an identification signal having a given frequency and a resonant circuit to amplify the signal. The transmitter is suitable to be placed in the vicinity of the body of a person to capacitively couple the identification signal to it. The safety system also comprises a receiver suitable to be capacitively coupled to the body in order to receive the first identification signal and to recognize based on the identification signal if a user is an authorized user. The safety system estimates the actual resonant frequency of the resonant circuit when the circuit is amplifying the signal and the microcontroller is adapted to choose as frequency for the identification signal the closest frequency to the estimated actual resonant circuit it can generate so that the amplification of the identification signal is maximized.

12 Claims, 9 Drawing Sheets

(51) Int. Cl.
  *F41C 33/02* (2006.01)
  *G01D 5/24* (2006.01)
(52) U.S. Cl.
  CPC ... *G01D 5/2405* (2013.01); *G07C 2009/0019* (2013.01); *G07C 2009/00261* (2013.01)

(56) References Cited

U.S. PATENT DOCUMENTS

| | | | |
|---|---|---|---|
| 2017/0059274 A1* | 3/2017 | Crist | F41C 33/0263 |
| 2019/0066421 A1* | 2/2019 | Girani | G07C 9/00309 |
| 2020/0288518 A1 | 9/2020 | Pavlov et al. | |
| 2021/0258080 A1 | 8/2021 | Sen et al. | |
| 2022/0376798 A1 | 11/2022 | Dussaume et al. | |

FOREIGN PATENT DOCUMENTS

| | | |
|---|---|---|
| WO | 2016209621 A1 | 12/2016 |
| WO | 2020152374 A1 | 7/2020 |
| WO | 2021079038 A1 | 4/2021 |

OTHER PUBLICATIONS

European Search Report for related patent application EP 21383158 issued by the European Patent Office and having a date when search completed of Sep. 16, 2022, 3 pgs. in English.

* cited by examiner

```
const uint16_t measure_freq[N_FREQ_STEPS] = {

291.3, 293.3, 295.4, 297.5, 301.7, 303.9, 306.2, 308.4, 310.7, 313.0, 315.4, 317.8, 320.2, 322.6, 325.1,
327.7, 330.3, 332.9, 335.5, 338.3, 341.0, 343.8, 346.6, 349.5, 352.5, 355.4, 358.5, 361.6, 364.7, 367.9,
371.2, 374.5, 377.9 };
```

|  | F1 | F2 | F3 |
|---|---|---|---|
| Group 1 | 335.5 | 338.3 | 341.0 |
| Group 2 | 332.9 | 338.3 | 343.8 |

| | Points | 1 | 2 | 3 | Vertex |
|---|---|---|---|---|---|
| Group 1 | Frequency [KHz] | 335,5 | 338,3 | 341 | 338,9 |
| | Amplitude [V] | 42,6 | 107,5 | 81,67 | |
| Group 2 | Frequency [KHz] | 332,9 | 338,3 | 343,8 | 338,5 |
| | Amplitude [V] | 26,35 | 107,5 | 36,3 | |
| Estimation [KHz] | | | | | 338,7 |

SAFETY SYSTEMS FOR OBJECTS AND METHODS

CROSS-REFERENCE TO RELATED APPLICATIONS

This application claims priority to European Patent Application EP21383158, which was filed on 17 Dec. 2021, which is pending and which is hereby incorporated by reference in its entirety for all purposes.

TECHNICAL FIELD

The present invention relates to the field of safety systems for objects which only allow their use to authorized users, to methods for controlling access to said objects and to kits comprising said safety systems. If the object the user is attempting to use is a weapon, these safety systems check if the user is an authorized user and only in such case allow the weapon to be fired.

DISCUSSION OF THE RELATED ART

There has always been the need to allow the use of certain objects, such as objects of value, special tools, instruments or weapons to one authorized user or to a certain group of authorized users that because of their knowledge or sense of responsibility can make good use of them. Safety systems for these objects do not allow a user to take the objects with them or prevent their normal use unless the user is authorized.

In the case of weapons, some existing solutions integrate mechanisms to verify the identity of the user handling the weapon, such as systems that recognize the fingerprint or require the introduction of a personal identification number (PIN), an alphanumeric password or a voice password for identifying the potential user, among many others. Although these solutions prevent in most cases the use of the weapon when the user is not authorized, they have a slow recognition speed and are not always reliable in situations where the user wears gloves or has oil or dirt in his/her fingers or in noisy environments.

A more favorable technique if the signal is to be transmitted in short distances is to capacitively transmit it along the human body. This technique, related to personal area networks (PAN) belonging to the near-field communication technology was already described in "IMB Systems Journal, Vol 35, No 3 & 4, 1996" (see FIG. 1). WO2020/152374 discloses an authorization management system which comprises a transmitter module worn by a person which capacitively transmits a signal through the body of the person and is received in a receiver placed on a weapon. WO2011/072682 provides a method where it is not only possible that two people or a person and an object recognize each other on the basis of the capacitive transmission of a signal through the body of a person but where it is possible to know if both persons or said person and an object which could be a gun are in physical contact with each other. It is known in the field of capacitive coupling that variations on the value of the capacitances of the signal transmission circuit through which the signal is transmitted have a big influence on characteristics of the signal such as its amplitude.

There is therefore a need in the field of capacitive transmission for a safety system capable of assuring that the intensity of the identification signal is high enough for the receiver to be able to identify if the user is an authorized user in spite of potential signal losses caused by the capacitances of the transmission path and the frequency of the carrier wave not corresponding to the actual resonant frequency of the resonant circuit when it is amplifying the signal. The actual resonant frequency of the resonant circuit might deviate from the theoretical value, which depends on the inductance of the coil L and the value of the capacitor C of said resonant circuit, due to several reasons such as parasitic capacitances in the resonant circuit or the load of the signal transmitter electrode.

SUMMARY

The safety system for an object according to the present invention is intended to make sure that the user is properly identified before the object, which could be a weapon, can be used, but does not only rely on the identification code of the transmitted identification signal to decide whether to unlock the object. Other parameters such as the intensity of the received signal play a role in said decision. It is therefore important that said signal is properly amplified.

The safety system for an object according to the invention comprises a transmitter, said transmitter comprising a microcontroller to generate an identification signal having a given frequency and a resonant circuit to amplify said identification signal. The transmitter is suitable to be placed in the vicinity of the body of a person to capacitively couple said identification signal to it. The safety system of the invention further comprises a receiver which is suitable to be capacitively coupled to said body in order to receive said identification signal and that is configured to recognize based on said identification signal if a user is an authorized user.

The safety system comprises resonant frequency estimation means to estimate the actual resonant frequency of the resonant circuit when the circuit is amplifying the identification signal. The microcontroller is further adapted to choose, based on said estimated actual resonant frequency, as frequency for the identification signal the closest frequency to the estimated actual resonant frequency it can generate so that the amplification of the identification signal is maximized. The safety system of the present invention is advantageous, among other reasons, because although the actual resonant frequency of the resonant circuit may suffer a deviation with respect to its theoretical value, the frequency of the identification signal generated by the microprocessor changes with it so that the amplification of the signal is maximized.

In some embodiments, the resonant frequency estimation means comprise a circuit intended to measure the amplitude of the output voltage of the resonant circuit. In some preferred embodiments, the circuit is a peak voltage measure circuit that measures the peak amplitude of the output voltage of the resonant circuit. The resonant frequency estimation means may be integrated into the transmitter or may be part of the safety system but being an external element to the transmitter. The safety system of the invention may comprise as well means to measure the intensity of the received identification signal and means to compare the measured intensity with a predefined intensity threshold. In some further embodiments, said predefined intensity threshold may be stored in a memory within the safety system or may be transmitted to the safety system from an external piece of equipment.

Another advantageous feature of the invention is that the safety system is able to recognize if the user is holding the object and how it is holding the object based on the change of the resonant frequency of the resonant circuit when it is amplifying the signal and the range of frequencies said frequency is in. In order to be able to implement this feature, the microcontroller of the safety system may successively estimate the resonant frequency of the resonant circuit when it is amplifying the identification signal so that, when the body of the person approaches the object varying the capacity, i.e., varying the capacitance, between the body and said object, the safety system is configured to measure the change in the estimated resonant frequency in a certain period of time due to the change of said capacitance. Said period of time may preferably be between 200 and 600 ms, and more preferably around 350 ms. When said change overpasses, i.e., exceeds, a predetermined value and the estimated resonant frequency at that instant is within a certain range the safety system is adapted to recognize a possible capacitive signal transmission scenario that is taking place. Said scenarios can be, among others, a scenario in that the person is not in physical contact with the object, a scenario in that the object is in contact with the object with his bare hands, or a scenario in that the person is holding the object wearing gloves or any other cloth or physical element between the object and the body of the user/person.

As mentioned before, not only the identification of the user may be taken into account in order to decide whether to unlock the object. The safety system of the invention may take the intensity of the transmitted signal as well into account. In fact, in some embodiments, the safety system is configured to generate an unlocking signal to unlock the object when the object is locked and the receiver receives the identification signal and identifies the user as an authorized user based on said identification signal and/or the intensity of the signal exceeds a first signal intensity threshold.

In some embodiments, the safety system is configured to generate a locking signal to lock the object when the objected is unlocked and the receiver receives the identification signal and based on said identification signal the user is not identified as an authorized user and/or the intensity of the signal is under a second signal intensity threshold.

Capacitive transmission is particularly sensitive to the environment because when the environment changes the capacitances and in general the impedances in the signal transmission circuit may change. In order to take the right decision on whether to lock, keep locked, unlock or keep the object unlocked the safety system of the invention may adapt to the environment by adjusting the first and second signal intensity thresholds according to the above mentioned different capacitive signal transmission scenarios.

The characteristics of the user have as well an influence on the capacitances of the signal transmission path. Certain particularly additional objects present in the environment influence as well the signal transmission. In order to adapt to the environment and take the right decision the safety system of the invention may be capable of adjusting the threshold intensity levels according to physical characteristics of the user such as its height or weight and/or according to the presence of certain objects around the user such as metallic elements.

The safety system of the invention can be advantageously implemented in different fields. The safety system of the invention can be for a different number of objects among which are a weapon, a vehicle, a tool, a jewel, a laboratory instrument or a piece of medical equipment. In some embodiments, the safety system also comprises the object.

Capacitive coupling between the different elements of the circuit is best implemented by means of electrodes. It is therefore preferred that, in some embodiments, the safety system comprises a ground transmitter electrode suitable to be capacitively coupled to ground and connected to the transmitter, a signal transmitter electrode connected to the transmitter and suitable to be coupled to the body of the person/user in order to transmit the identification signal, a ground electrode connected to the receiver and capacitively coupled to ground and a signal receiver electrode connected to the receiver and capacitively coupled to the body of the person/user.

Several possible locations for the electrodes are foreseen in the present invention. According to one embodiment the transmitter and/or the signal and ground transmitter electrodes can be comprised in a bracelet. This embodiment is advantageous because a bracelet can be easily worn by a user in different parts of his/her body.

In some embodiments, the signal transmitter electrode and the ground transmitter electrode are located in a holster belt loop of a holster assembly of a weapon, which is preferably a pistol. As the holster is necessary to hold the weapon when it is not in use the user does not have to carry or wear any additional means comprising signal transmitter or ground transmitter electrodes. Other locations for the signal and ground transmitter electrodes could be possible provided that the capacitive transmission of the signal between the transmitter and receiver is guaranteed. The safety system may comprise the holster belt loop and/or the holster assembly of the weapon.

One particularly advantageous transmitting arrangement takes place when the resonant circuit is an LCR circuit which amplifies the modulated signal. LCR circuits are best suited to amplify narrowband signals. In this embodiment, the microcontroller generates a carrier signal which is preferably a sinusoidal carrier signal at 333 Khz approximately, which is a frequency at which signal transmission along or across a biological body such as a human body has been proved to take place with low attenuation.

According to one embodiment of the invention, the microcontroller comprises a clock and is only able to generate a certain number of frequencies depending on the frequency of the clock.

Another object of the invention is a holster assembly of a weapon or a holster belt loop of a holster assembly of a weapon. The holster assembly or the holster belt loop comprises the safety system as previously described, or comprises at least the signal transmitter electrode and the ground transmitter electrode of the safety system as previously described.

Another object of the invention is a method for controlling access to an object. Said method comprises the steps of:
  i) estimating, by the resonant frequency estimation means, an actual resonant frequency of the resonant circuit when the resonant circuit is amplifying a first identification signal. Said first identification has been generated, e.g., previously generated, by the microcontroller and has a first frequency;
  ii) choosing, by the microcontroller and based on the estimated actual resonant frequency, a second frequency for a second identification signal which is the closest frequency to the estimated actual resonant frequency the microcontroller can generate;
  iii) amplifying, by the resonant circuit, the second identification signal so that an amplified identification signal is generated. By having generated an identification signal having a second frequency that is the closest frequency to the estimated actual resonant frequency the microcontroller can generate, the amplification is maximized;
  iv) receiving, at the receiver, the amplified identification signal; and v) recognizing, by the receiver, if the user/person attempting to use the object is an authorized user based on the received amplified identification signal.

While step i) can be carried out only once to trigger the process, steps ii)-v) can be carried out iteratively to generate an identification signal with a frequency that is the closest frequency to the estimated actual resonant frequency the microcontroller can generate at any moment. In this way, any deviation of the actual resonant frequency of the resonant circuit with respect to its theoretical value can be considered by the microprocessor when selecting the corresponding identification frequency so the amplification of the identification signal is always being maximized. This minimizes the possibilities that the receiver makes an erroneous identification of the user and also is helpful when determining the particular capacitive signal transmission scenario in which the safety system is located.

As mentioned before, it is important that the identification signal has the closest frequency possible to the resonant frequency of the resonant circuit when it is amplifying the signal in order to make sure that amplification in the resonant circuit is maximized. Then, the safety system according to the invention is capable of estimating the resonant frequency of the resonant circuit when it is amplifying the signal so the microprocessor is able to generate the required frequency signal. Thus, in some embodiments, the step of estimating the actual resonant frequency of the resonant circuit comprises the sub steps of:

a) identifying a first set of frequencies among those the microcontroller can generate;
b) ranking said frequencies according to their value;
c) identifying, starting from the first one, every 'n' frequencies of said ranked frequencies, preferably where 'n' is a power of 2;
d) measuring the gain corresponding to each of said frequencies in the resonant circuit;
e) identifying the frequency with the highest gain among the identified frequencies and recording said frequency value as hfv and its gain as hfg;
f) assigning number 1 to the iteration counter 'm' such that m=1;
g) identifying the frequencies situated at a distance $n_m = n/(2^m)$ of the ranked frequencies;
h) measuring the gain corresponding to each of said frequencies in the resonant circuit;
i) identifying the frequency with the highest gain among the identified frequencies and its corresponding frequency value, and recording said frequency value as hfv and its gain as 25 hfg;
j) checking if $n_m = 1$ and if it is the case continuing with step m);
k) adding 1 to the iteration counter 'm';
l) going back to step g);
m) identifying a first group of 3 frequencies containing the frequency with the highest gain and the two frequencies close to it in the set of ranked frequencies;
n) identifying a second group of 3 frequencies containing the frequency with the highest gain and the two frequencies among the ranked frequencies separated a distance two from the frequency with the highest gain;
o) calculating the maximum of a polynomic curve of second order approaching the gain curve for each group by means of the formula $$Freq_{vertex} = \frac{f_1 + f_2}{2} - \frac{1}{2}\frac{a_2 - a_1}{2a_2 - a_1 - a_3}(f_3 - f_1)$$

where $f_1$, $f_2$ and $f_3$ are each of the frequencies of each group and $a_1$, $a_2$ and $a_3$ are the voltages corresponding to these frequencies; and p) calculating as final estimation of the resonant frequency value of the resonant circuit when it is amplifying the signal generated by the microprocessor the mean of the two frequencies calculated in step o).

Another object of the invention is a kit comprising a first object, in particular a weapon, vehicle, tool, laboratory instrument, piece of medical equipment or any other object whose access and use only by authorized users is to be controlled by the safety system, comprising the receiver of the safety system as previously described and a second object, in particular a bracelet, jewel, cloth, weapon holster or any other wearable object or that can be coupled to a user in proximity to its body, comprising the transmitter of the safety system as previously described. In such embodiment, the signal and ground transmitter electrodes are, preferably, located in the second object while the signal and ground receiver electrodes are located in the first object. In such embodiment, the estimation resonant frequency means are preferably located also in the second object.

In one possible embodiment of the invention, said first object, when it is a weapon, comprises a switch which comprises means to block or unblock the shooting mechanism of the weapon.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures.

DETAILED DESCRIPTION

Figure 1:
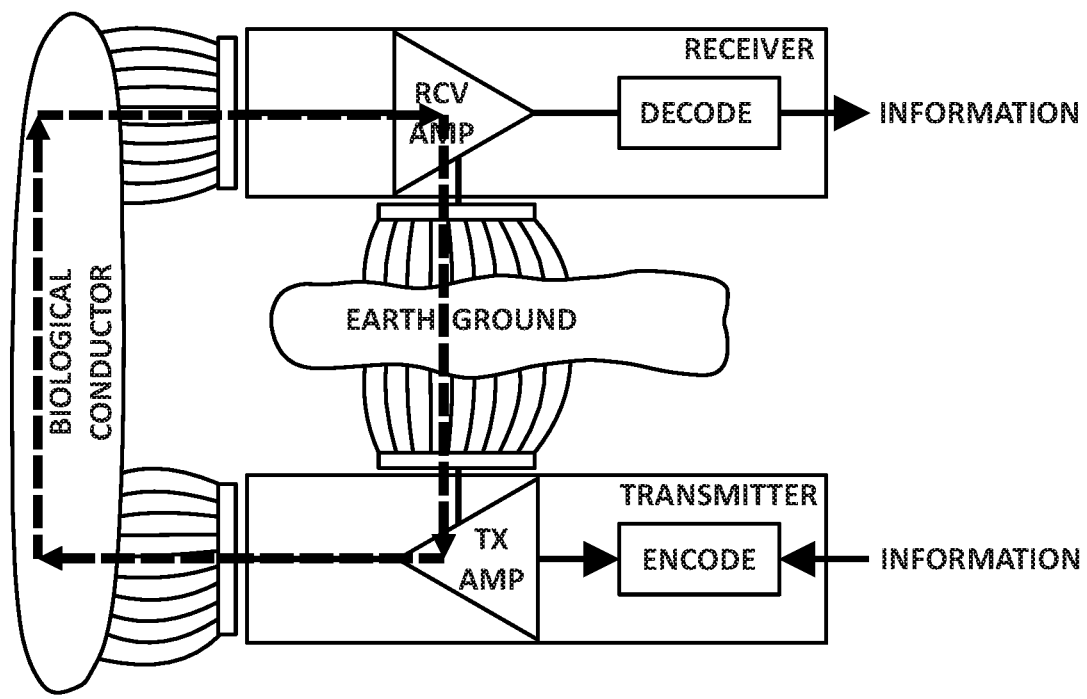
FIG. 1 shows a block diagram of a known capacitively coupled signal transmission circuit along a biological conductor (Personal Area Network (PAN) system).

A system which makes possible to generate and encode a signal, to capacitively couple said signal to the body of a person, transmit it through it and capacitively receive said signal by means of a receiver which decodes the signal in order to extract the coded data is already disclosed in the publication "Personal Area Networks (PAN) Near-Field Intra-Body Communication MIT 1995". This publication discloses also that the human body transmits particularly well at 333 Khz. As can be seen in the scheme of FIG. 1 (extracted from said document) the signal is transmitted through the body of a person and returns through the ground. FIG. 1 shows that the transmitter and the receiver are both capacitively coupled to ground and to the body of the person. It also shows the couplings necessary for the signal to transmit. Nevertheless, other couplings appear naturally because the elements of FIG. 1 are not isolated from the environment.

Figure 2:
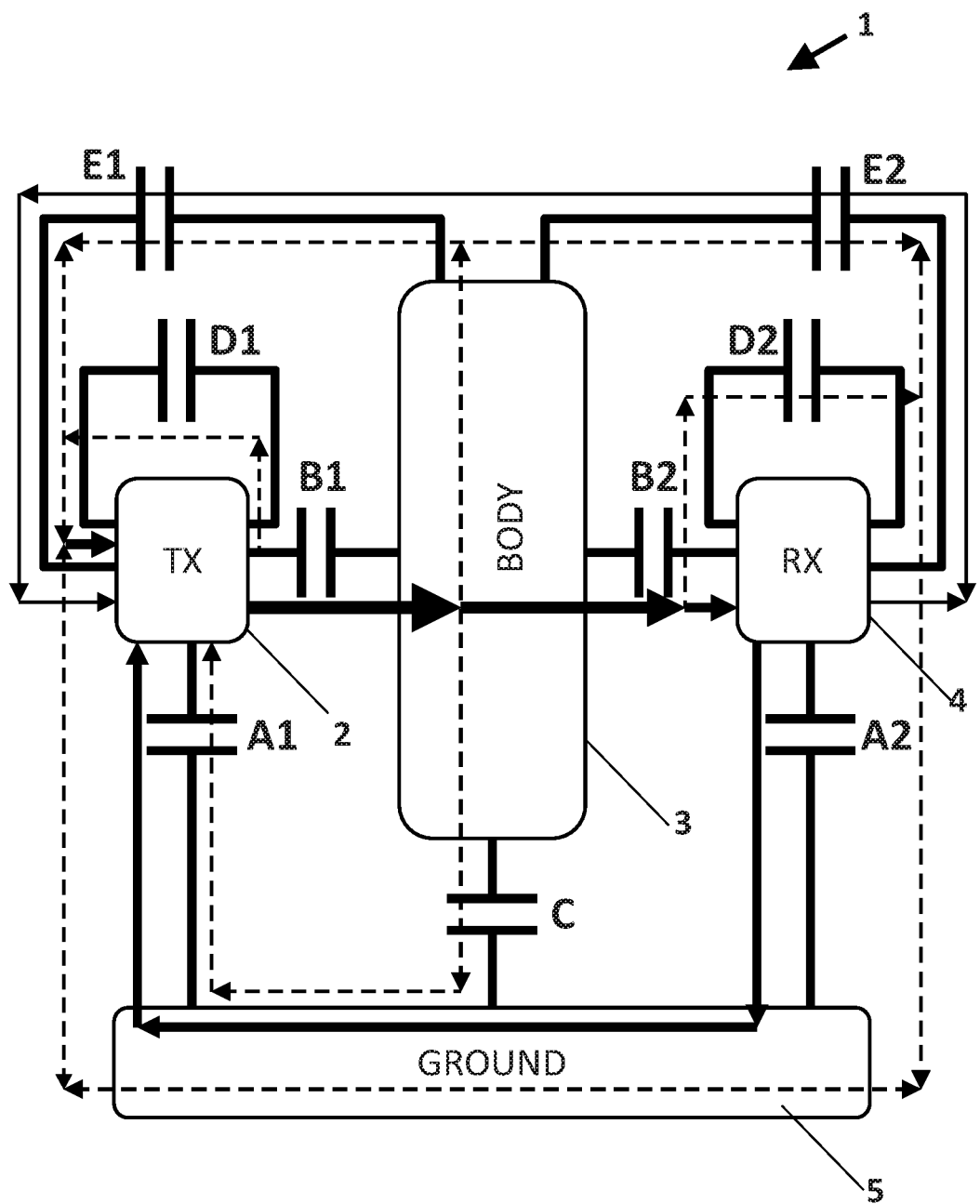
FIG. 2 shows an electrical scheme of the safety system for an object.

FIG. 2 depicts an electrical scheme (1) of the signal transmission of the safety system according to the invention which takes into account the electrical environment where it is situated. As illustrated in FIG. 2, the ideal path for signal transmission is formed by the capacitance B1 between the signal electrode (not shown in this figure) of the transmitter TX (2) and the body (3) of the person, the body (3), the capacitance B2 between the body (3) and the signal electrode (not shown in this figure) of the receiver RX (4), the receiver RX, the capacitance A2 between the ground electrode (not shown in this figure) of the receiver RX (4) and ground (5), ground (5), the capacitance A1 between ground (5) and the ground electrode (not shown in this figure) of the transmitter TX (2) and the transmitter TX (2).

Unfortunately, other capacitances appear which contribute to signal losses. One of these capacitances is the capacitance D1 formed between the signal electrode and the ground electrode of the transmitter TX (2). The same principle applies to the receiver RX (4) which has capacitance D2 formed between the signal and ground electrodes of the receiver RX (4). These undesired capacitances D1 and D2 diminish with the distance between the signal and ground electrodes. In this respect, it is therefore advantageous to keep the signal and ground electrodes far apart from each other. Capacitances E1 and E2 between the ground electrode of the transmitter TX (2) and the receiver RX (4) and the body (3) of the person define as well undesired return signal paths which contributes to signal losses. A particularly bad scenario is when the person touches any of the ground electrodes of the transmitter TX (2) and the receiver RX (4).

The scheme of FIG. 2 shows that capacitance C defines as well an undesired return path for the transmitted signal. Said return signal path increases when the body (3) of the person is in direct contact to ground (5) or close to a metallic body (not shown in this figure). A very unfavorable situation is when the body (3) of the person touches a metallic element which is connected to ground (5).

As previously mentioned, the capacitances E1, D1, E2, D2 and C depicted in FIG. 2 cause a signal loss in the transmitted signal. The value of these capacitances does not remain always the same because the environment, in particular, the electrical environment, in which the system is situated changes and because the distance between the different elements of the system may change too.

One of the main reasons influencing signal transmission is the distance between the body (3) of the person and the receiver RX (4). Capacitance B2 suffers a big change when the person is about to hold an object (including the receiver) which could be a weapon or when he or she finally holds the said object. Even in the case that the person holds the object, capacitance B2 depends on additional factors such as that the person wears gloves.

If the intensity of the received signal is used as one of the parameters to decide if the object, e.g., the weapon, should be locked or unlocked and the intensity of the signal depends in particular of capacitance B2, it is of vital importance to identify if the user/person, the hand of the user, is in the vicinity of the object or holds the object, which could be a weapon.

Figure 3:
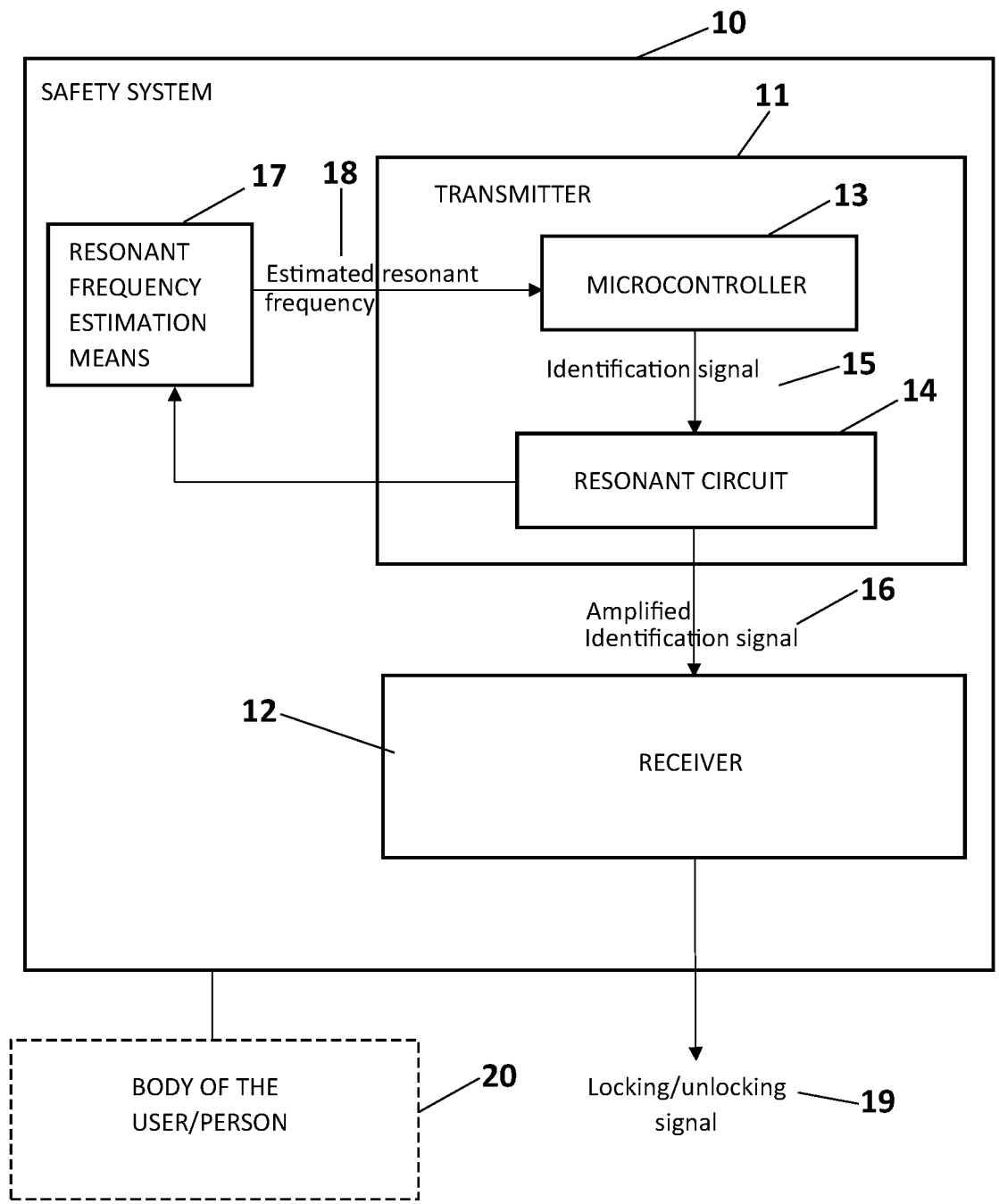
FIG. 3 is a block diagram of the safety system for an object, according to an embodiment of the invention.

FIG. 3 is a block diagram of the safety system (10) for an object (not shown in this figure), according to a particular embodiment of the invention. It should be understood that the safety system (10) depicted in FIG. 3 may include additional components and that some of the components described herein may be removed and/or modified without departing from a scope of the safety system (10).

The safety system (10) comprises a transmitter (11) comprising a microcontroller (13) that is configured to generate an identification signal (15), e.g., an amplitude modulated signal, having a given frequency. Said identification signal (15) unequivocally identifies the user attempting to use the object and it is to, once received at the receiver (12), determine by said receiver (12) whether the user is an authorized user or he is not. The transmitter (11) also comprises a resonant circuit (14) that amplifies said signal (15) before it is sent to the receiver (12). The transmitter (11) is suitable to be placed in the vicinity of the body (20) of the person attempting to use the object so that said identification signal (5) can be capacitively coupled to said body (20). For example, the transmitter (11) may be worn by the user in a bracelet, ring, belt, etc.

The safety system (10) further comprises resonant frequency estimation means (17) to estimate the actual resonant frequency of said resonant circuit (14) when the resonant circuit (14) is amplifying said identification signal (15) and the microcontroller (13) is adapted to choose as the frequency for the identification signal (15) the closest frequency to the estimated actual resonant frequency (18) the microcontroller (13) can generate. Doing so, the amplification of the identification signal (15) in the resonant circuit (14) is maximized. By maximizing the amplitude of said identification signal (15) a more reliable identification of the user can be carried out at the receiver (12) and the higher intensity level of the received identification signal (16) can be used to identify a particular capacitive signal transmission scenario in which the safety system (10) is located. These transmission scenarios can be: the person is not in physical contact with the object, the object is in contact with the object with his bare hands, or the person is holding the object wearing gloves or any other cloth. By knowing the scenario, the safety system can adapt its own operational parameters so the generation and read of the identification signal is improved and the overall reliability of the system is increased.

Said receiver (12) is suitable to be capacitively coupled to said body (20). For example, the receiver (12) may be coupled to or integrated into the object. The receiver (12) is configured to receive the amplified identification signal (16) and to recognize based on said identification signal (16) if the user attempting to use the object is an authorized user. Then, the receiver (12) may generate a locking or unlocking signal (19) to allow or deny access, respectively, for the user to the object. By way of example, the receiver (12) may compare an identification code from the received identification signal (16) with a list of codes associated to authorized users, the list being previously stored in a memory in the receiver (12), to determine whether that particular user is an authorized user or is not.

In the safety system (10) the identification signal (16) is capacitively transmitted between the transmitter (11) and the receiver (12). Transmission of a signal by means of capacitive coupling has a number of advantages in systems where the transmitter and the receiver are located in proximity to each other or in proximity to the transmission medium, in the case of the present invention the body (20) of a person. For example, this is the case in safety systems (10) where the transmitter (11) is worn by a person and the receiver (12) is located in the object, which could be a weapon, which comprises a locking and unlocking mechanism.

In capacitive transmission systems, as only transmitters located in proximity to the body of a person are able to transmit a signal the receiver receives normally only one signal and does not have to process different signals in order to identify the right one. In the present invention the same applies to the receiver which is preferably placed in the weapon which is to be located close the body of the person in order to receive the signal transmitted by the transmitter.

Capacitive coupling has other advantages such as that the transmitted signal/signals is less prone to be detected or intercepted and that it is more difficult to disrupt it by means of interference. This is the case in the safety system (10) of the present invention where the transmitter (11) and the receiver (12) are located in proximity to the body (20) of a person which serves as transmission medium.

Figure 4:
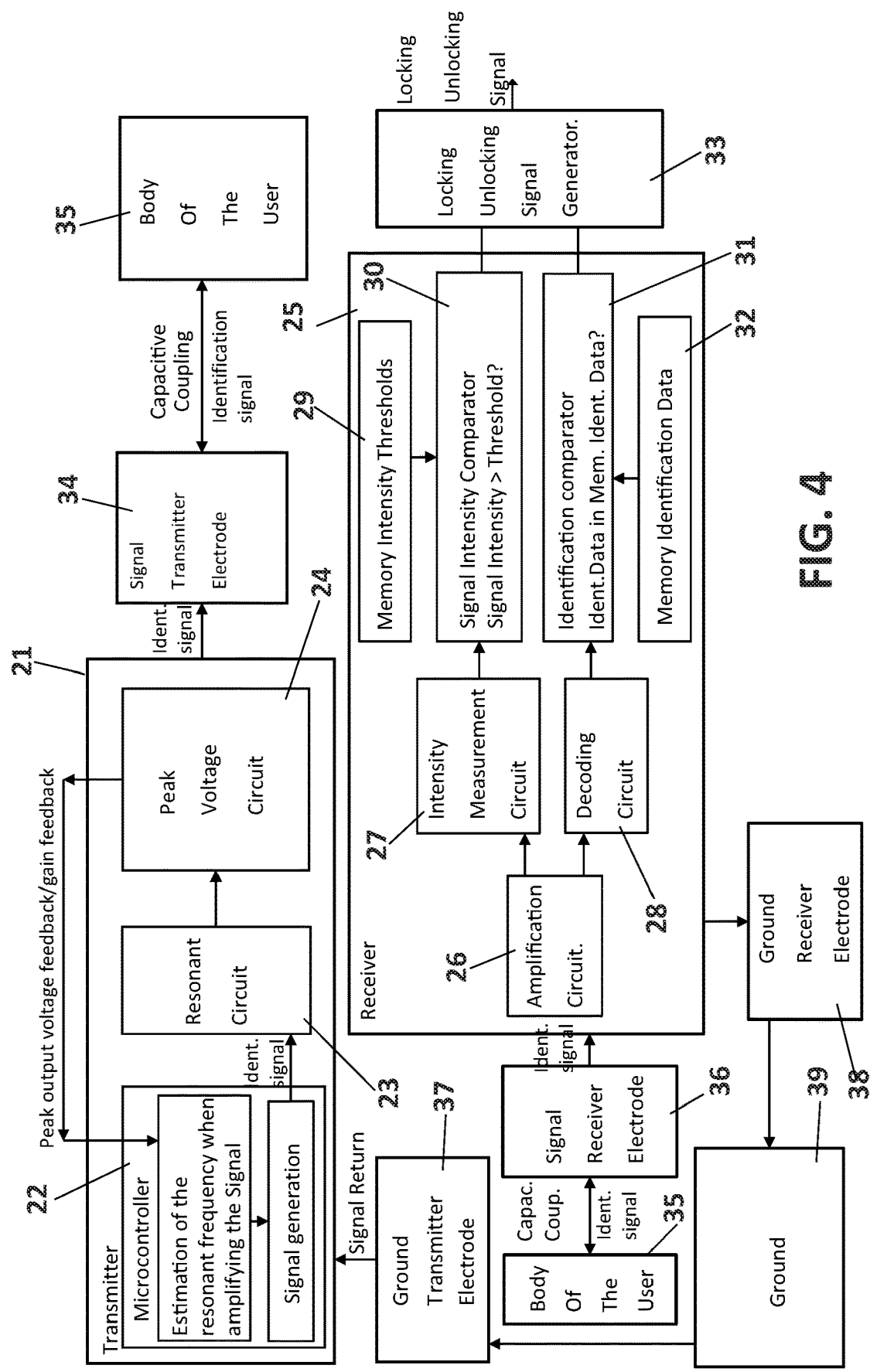
FIG. 4 shows a block diagram of the safety system for an object, according to another embodiment of the invention.

FIG. 4 shows a block diagram of the safety system for an object, according to another particular embodiment of the invention. It should be understood that the safety system depicted in FIG. 4 may include additional components and that some of the components described herein may be removed and/or modified without departing from a scope of the safety system.

The safety system comprises a transmitter (21) which in turn comprises a microcontroller (22), a resonant circuit (23) and a peak voltage circuit (24). The peak voltage circuit (24) measures the peak amplitude of the output voltage of the resonant circuit (23) and may be part of the resonant circuit (23) or may be a device external to it. The resonant circuit (23) amplifies the identification signal. In this embodiment, the microcontroller (22) comprises the resonant frequency estimation means so it estimates the actual resonant frequency of the resonant circuit (23) while it is amplifying the identification signal based on the peak output voltage feedback or gain feedback received from the peak voltage circuit (24). Alternatively, said resonant frequency estimation means may be an independent device within the transmitter (21) or a device external to the transmitter (21) as shown in FIG. 3. The microcontroller (22) also generates the identification signal based on the estimated resonant frequency. The identification signal contains data to identify the user/person and has a given frequency. In a preferred embodiment of the invention, the identification signal is an amplitude modulated signal (15).

In order obtain a modulated signal, the microcontroller (22) generates a carrier signal at a given frequency. The frequency of the carrier signal is, preferably, the closest to 333 kHz as possible. The resonant circuit (23) then amplifies the modulated signal and sends it to the receiver (25). The choice of the mentioned way of generating, modulating, transmitting and amplifying the identification signal is advantageous because it meets the transmission needs, the identification of the user/person among a limited number of users does not need in principle of a big data exchange, and at the same time can be made with off the shelf components.

As depicted in FIG. 4, the receiver (25) comprises an amplification circuit (26) which firstly amplifies the received identification signal and an identification comparator (31) which compares the identification data from the identification signal, once decoded by the decoding circuit (28), with data from identification data storing means (32), such as a memory storing a list of authorized users or a black list of non-authorized users, in order to check if the user is an authorized user. Alternatively, the comparison may take place in the microcontroller (22) of the transmitter (21) if the output from the decoding circuit (28) and from the identification data memory (32) is fed back to the microcontroller (22) via the capacitive circuit.

The receiver (25) not only checks that identification data carried by the received identification signal corresponds or not to an authorized user but checks as well if the intensity of the received signal is over a threshold. In order to be able to perform the intensity comparison, the receiver (25) further comprises an intensity measurement circuit (27), means to store different intensity thresholds, such as a memory (29), and a signal intensity comparator (30). Optionally the comparison may be performed in the microcontroller (22) located in the transmitter (21) if the output of the intensity measurement circuit (27) and of the decoding circuit (28) is transmitted back to the microcontroller (22) via the capacitive circuit.

The output from the signal intensity comparator (30) and the output of the identification comparator (31) are connected to a locking/unlocking signal generator (33) which may comprise means (not depicted) to decide whether to generate a locking/unlocking signal based on the input coming from the signal intensity comparator (30) and the identification comparator (31). Said means may alternatively be comprised in the receiver (25). In another embodiment, when the output of the signal intensity comparator (30) and the output from the identification comparator (31) is fed back to the microcontroller (22) of the transmitter (21) said microcontroller (22) may command directly the locking/unlocking signal generator (33). Alternatively, the system may not comprise a signal generator (33) and the locking/unlocking signal may be generated directly in the microprocessor (22) of the transmitter (21).

FIG. 4 also shows the capacitive couplings between the different elements of the safety system. Said couplings have been implemented with electrodes. In particular, a ground transmitter electrode (37) capacitively couples ground (39) to the transmitter (21) to transmit a signal return, a signal transmitter electrode (34) capacitively couples the body (35) of the person/user to the transmitter (21) to transmit the identification signal, a ground receiver electrode (38) capacitively couples ground to the receiver (25) to transmit the signal return and a signal receiver electrode (36) capacitively couples the body (35) of the person/user to the receiver (25) to transmit the identification signal. As previously mentioned, capacitances D1, D2 between the signal (34,36) and ground electrodes (37,38) should be minimized in order to minimize signal losses in the transmission path.

As previously mentioned, the attenuation of the capacitively transmitted signal may be a problem. If the intensity of the received signal is compared to a fixed intensity threshold and because of a certain scenario the impedance of the signal path is surprisingly high said intensity may lie under said threshold. This may be the situation for example when the user wears certain kind of gloves. As a result, the user may be an authorized user and be in contact with the object, for example holding the object, but the safety system may remain locked which in the case of the object being a weapon means that the user would not be able to fire the weapon.

In order to solve this problem, according to one advantageous embodiment of the present invention, the safety system is capable of choosing the intensity threshold which suits the recognized scenario among a set of thresholds. As depicted in FIG. 4, these set of thresholds may be stored in a memory of intensity thresholds (29) or alternatively may be transmitted to the receiver (25) from additional equipment.

As a result of adapting the intensity thresholds to the environment it is possible to check in a secure manner both, if the user is authorized and if the user is in touch or holding the object in order for the system to decide whether to unlock the object. It is obvious that in the case of the object being a weapon it is of vital importance that the safety system works reliably. Recognizing which scenario takes place has the final objective of deciding whether the object should remain locked or unlocked, to lock it or to release the locking mechanism in order for the user to be able to fire the weapon.

According to one embodiment of the present invention if the object is locked, signal generating means of the safety system, which could be the locking/unlocking signal generator (33) or the microcontroller (22) of the transmitter (21), may generate an unlocking signal in order to unlock the object when the receiver (25) identifies the user as an authorized user based on the received signal and the intensity of the signal exceeds a preestablished first signal intensity threshold level. In case the object is unlocked, said signal generating means may generate a locking signal in order to lock the object when the user is not identified as an authorized user or/and the intensity of the signal is under a preestablished second signal threshold level.

As mentioned before, depending on the embodiment the signal generating means may be the microcontroller (22) of the transmitter (21), another microcontroller of the receiver (25), or the locking/unlocking signal generator (33) which can be comprised in the receiver (25) or otherwise connected to it in order to receive the output of the signal intensity comparator (30) and the identification comparator (31).

To take into account both the data and the intensity of the identification signal is advantageous because a system that only checks the identity of the user would allow that when an authorized user is close enough to the object, let's say a weapon, the weapon would turn to be or remain unlocked making possible for an unauthorized user/person to fire the weapon.

In the case of the safety system of the present invention this situation could not take place because when the unauthorized user would hold the weapon the intensity of the transmitted signal would diminish and would have a value under the value of the intensity threshold so that the weapon would turn or remain locked. The safety system of the invention is as well capable of adjusting the threshold intensity which may be recorded in the memory of intensity thresholds (29) according to physical characteristics of the user/person such as its height and/or according to the presence of certain objects in the environment such as metallic elements.

The object could as well be a piece of medical equipment. The present invention is particularly advantageous when said piece of medical equipment uses capacitive transmission and is capacitively coupled to the human body by means of a signal transmitter electrode and a signal ground electrode.

In the safety system according to one embodiment of the invention the transmitter is located in the bracelet, the receiver is located in an object which could be a weapon, the transmitting medium is the body of a person and the return of the signal from the receiver to the transmitter is the ground. One practical solution according to the invention is to integrate the transmitter (21) together with the signal transmitter electrode (34) and the ground transmitter electrode (37) in a bracelet which the user could wear in his wrist or his ankle.

According to one embodiment of the invention the safety system could be installed into a vehicle. The user is isolated from the ground when he is within the vehicle. Signal transmission is nevertheless possible because the chassis of the vehicle serves as a return path for the signal. According to another embodiment of the present invention, when the object is a pistol, the signal (34) and ground (37) transmitter electrodes are placed in the holster of the pistol. This arrangement is particularly advantageous because the user/person does not need to wear any additional support for the electrodes. In this embodiment the transmitter (21) may preferably be also arranged in the holster.

Resonant circuits are simple to implement and are suitable to amplify narrowband signals. Preferably, the resonant circuit may be an RLC circuit. They consume very little energy because the only energy dissipated is the energy dissipated in the resistor which has a low value in order to keep the amplification at the desired level. As energy needs are small according to one embodiment of the invention the battery can be small in size and can be integrated in a bracelet.

According to the present invention a method, which is preferably an iterative method, of estimating the actual resonant frequency of the resonant circuit when it is amplifying the modulated signal has been developed in order to estimate said frequency with accuracy.

Figure 5:
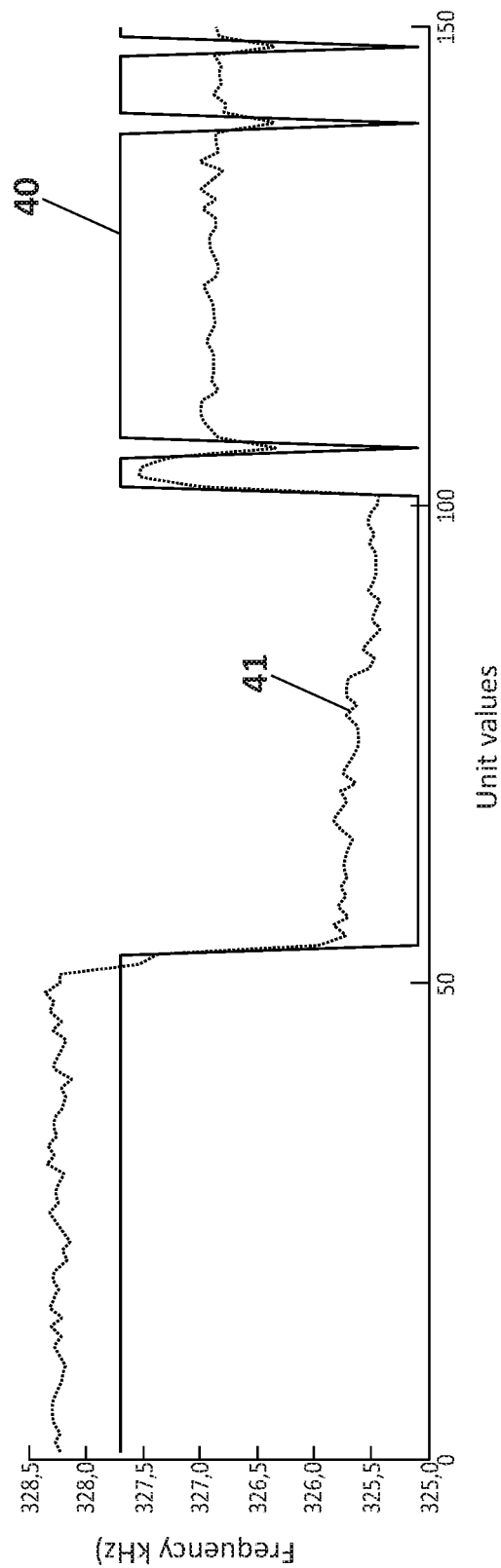
FIG. 5 is an illustration of the frequency values of the resonant circuit when the circuit is amplifying the signal in three different scenarios, according to an embodiment of the invention.

As can be seen in the graph of FIG. 5, and making reference to the elements of the safety system (10) of FIG. 3, the continuous line (40) represents, of all the frequencies that the microcontroller (13) can generate, the one that has the highest amplitude, which is the frequency at which the signal carrier will be emitted during the next iteration of the method. This frequency (40) does not suffer a big deviation in percentage (changes from 328.0 to 325.0 kHz) under foreseen circumstances such as that the user does not hold the object which could be a weapon (0-50 in the X axis), holds the weapon with one bare hand (50-100 in the X-axis) or holds the weapon wearing a glove in his hand (100-150 in the X axis). In this figure the X axis is divided into unit values corresponding one unit to 300 ms. The dotted line (41) represents the estimated value of the resonant frequency (18) when the resonant circuit (14) is amplifying the signal (15) generated in the microcontroller (13). On the contrary, the frequency (41) does allow to differentiate between the three cited scenarios (0-50 in the X axis, 50-100 in the X-axis and 100-150 in the X axis) because it shows a significant deviation.

Figures 6, 7:
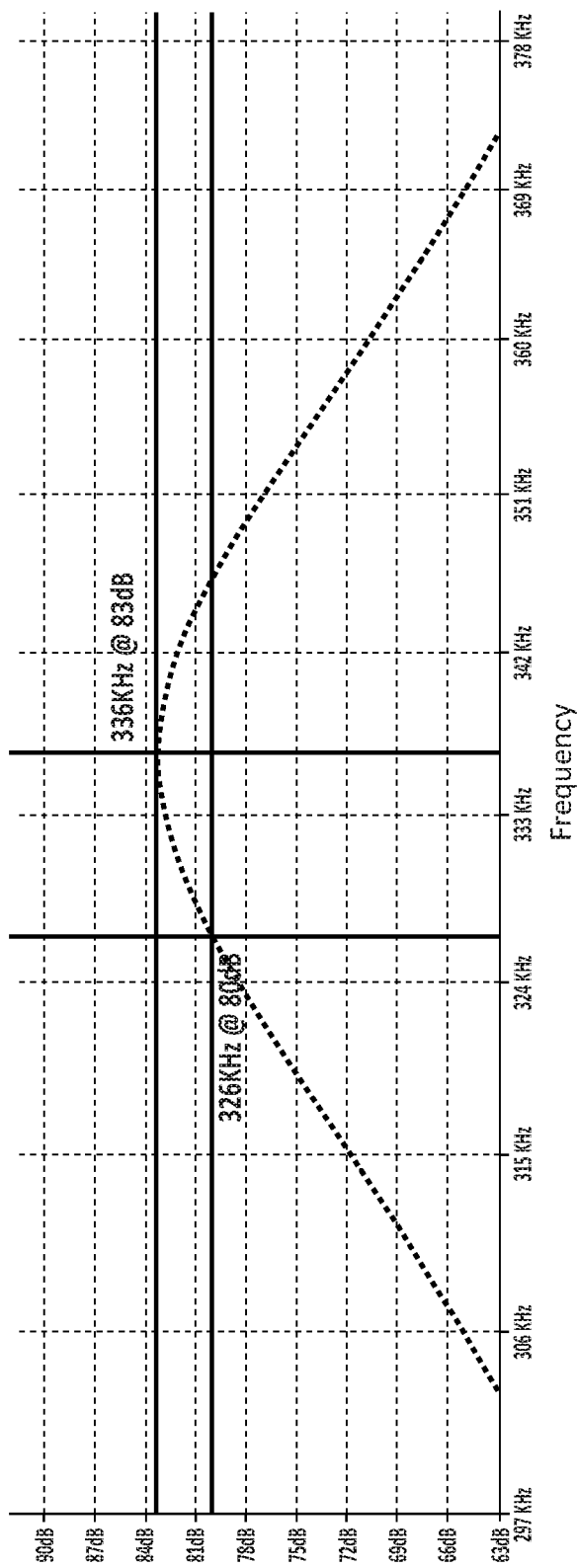
FIG. 6 shows a receiver amplification gain curve of a receiver, according to an embodiment of the invention.
FIG. 7 illustrates a set of the possible frequencies generated by the microprocessor according to the invention.

FIG. 6 depicts an example of a receiver amplification gain curve according to the invention. As can be seen in the graph of FIG. 6, and making reference to the elements of the safety system (10) of FIG. 3, in this curve a change of 10 kHz corresponds to a 3 dB amplification loss. There is therefore an interest to transmit at a frequency close to 333 kHz (Only 3 kHz apart from 336 kHz) so that the gain of the received signal is kept close to its maximum.

Although this constraint is taken into account, the safety system (10) sets the priority in amplifying the generated signal (15) in the resonant circuit (14). In order to maximize the amplification of the generated signal (15) the microcontroller (13) runs an iterative method to estimate the resonant frequency (18) of the resonant circuit (14) when it is amplifying the signal and chooses as frequency for the carrier signal the closest possible to the estimated frequency (18). This choice of frequencies takes into account that in most of the cases the microcontroller (13) can only generate carrier signals which are divisions of the frequency of its clock. As previously mentioned according to the present invention a method (26) which is preferably an iterative method (27) has been developed in order to estimate the actual resonant frequency (24) of the circuit when it is amplifying the modulated signal (5).

As it is explained below, in order to implement the estimation of the resonant frequency, it is necessary to measure the output amplitude, preferably the peak output amplitude, of the signal coming out from the resonant circuit (14).

In order to implement the method of estimating the actual resonant frequency (18) of the resonant circuit (14) when it is amplifying the signal (15) the microcontroller (13) chooses among all the possible frequencies it can generate a set of frequencies around 333 kHz which, as said before, is a frequency at which signal transmission along the human body is particularly good. It is possible to rank these frequencies according to their value as if they were part of a frequency table, frequency table which is depicted in FIG. 7.

Starting from the first one, one every 'n' frequencies of said table is chosen and the gain of each of those signals (15) with said frequency in the resonant circuit (14) is measured. If n=8 and the table of frequencies is the one of FIG. 7, the frequencies chosen would be 291.3, 310.7, 330.3, 352.5 y 377.9 kHz.

Figure 8:
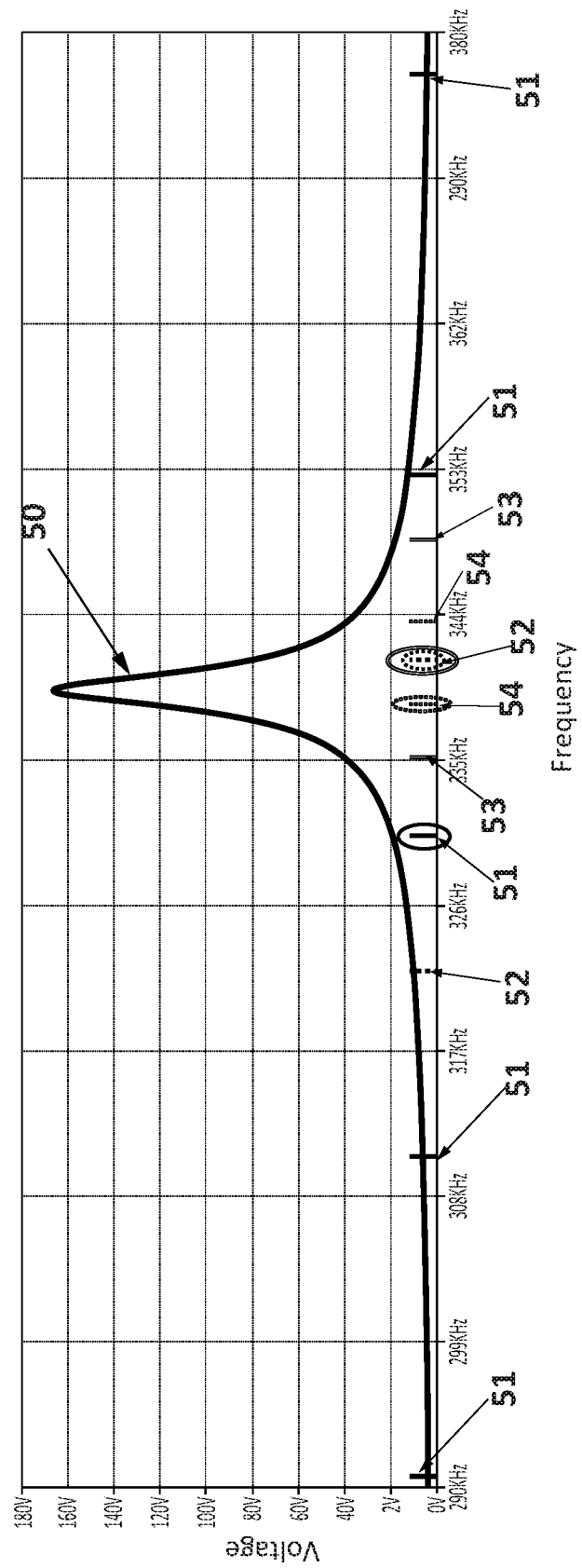
FIG. 8 depicts an example of a gain curve of the resonant circuit including in its x-axis some frequency values at which the gain is estimated, according to an embodiment of the invention.

FIG. 8 depicts an example of a gain curve (50) of the resonant circuit including in its x-axis some frequency values at which the gain is estimated. These five frequencies (291.3, 310.7, 330.3, 352.5 y 377.9 kHz) (51) are marked on the X axis of FIG. 8 with thick black lines. As can be seen in this figure, the frequency (330.3 kHz) (51) with the highest gain, the highest voltage value, is drawn within a thick black circle. The safety system (10) is capable of identifying the frequency with the highest gain by comparing the values measured in the peak voltage circuit corresponding to the different signals chosen, identifying the one with the highest peak output voltage and calculating the signal gain.

In an embodiment according to the invention the microprocessor can compare the peak output values because these values are fed back to it from the peak output voltage (See feedback loop between the peak voltage circuit and the microcontroller in the transmitter of FIG. 4). Alternatively, the safety system of the invention includes means to calculate the gain of each of the peak voltage measurements and feeds the gain back to the microprocessor.

Two frequencies (52) which are located at n1=n/2 distance in the table of frequencies to the identified frequency are then chosen. In the particular example depicted in FIG. 8, if n=8 then n1=n/2=4 frequencies 320.2 and 341.0 (52) are then selected. The frequency with the highest gain taking into account these two frequencies (320.2 and 341.0 kHz (52)) and the frequency with the highest gain spotted until this step (330.3 kHz) (51) in the method is selected. In this particular case, it is one of the two frequencies (52) (341.0 kHz) that is within a dotted circle.

Another iteration is then performed choosing the two frequencies at n2=n1/2 distance from said last chosen frequency. In the example n2=2. These two frequencies 335.5 and 346.6 kHz (53) are drawn with two parallel vertical lines in the X axis of FIG. 8. As in the previous step the gain of these two frequencies (335.5 and 346.6 kHz (53)) and the gain of the frequency with the highest gain spotted until this step (341.0 kHz (52)) in the method are compared in order to select the frequency with the highest gain. It turns to be in this step that the frequency (341.0 kHz (52)) with the highest gain spotted until this step is higher than the gain of each of the two frequencies drawn with two parallel vertical lines in the figure. The frequency (341.0 kHz (52)) selected in this step is marked with two concentric circles and is the same frequency marked with the dotted line in the previous step.

Another iteration is then performed where frequencies at a distance n3=n2/2=2/2=1 from the frequency (341.0 kHz (52)) selected in the previous step are chosen. These two frequencies 338.3 and 343.8 kHz (54) are marked in with empty squares in the x axis of FIG. 8. The gain of these two frequencies (338.3 and 343.8 kHz (54)) and the gain of the frequency with the highest gain spotted until the present step (341.0 kHz (52)) in the method are compared. The frequency 338.3 kHz (54) with the highest gain among these three is circled with empty squares in FIG. 8. As n3=1, no more iterative steps are performed in this part of the method.

This first iterative part of the method ends after an 'm' number of iterations when nm=1. In the case of n=8 the number of iterations would be 3 and on the basis of the gain curve and the table of frequencies of the example the chosen frequency would be 338.3 kHz.

In order to better the estimation of the resonant frequency further calculations take place.

Two groups of three frequencies are formed. The first one comprises the last chosen frequency and the two frequencies close to it in the table of frequencies and the second one comprises the chosen frequency and the two frequencies which are two frequencies apart from said chosen frequency. In the followed example the frequencies of these two groups together are 332.9, 335.5, 338.3, 341.0 y 343.8 kHz, being the two groups the ones of FIG. 9.

As the gain curve is nearly a polynomic curve of second order the frequency corresponding to its maximum could be estimated by means of the equation.

$$Freq_{vertex} = \frac{f_1 + f_2}{2} - \frac{1}{2}\frac{a_2 - a_1}{2a_2 - a_1 - a_3}(f_3 - f_1)$$

Where $f_1$, $f_2$, $f_3$ are the frequencies of each group and $a_1$, $a_2$, $a_3$ are the voltage amplitudes corresponding to said frequencies.

The equation is applied to each of these two groups having as a result two values of frequencies which are 338.9 and 338.5 kHz.

Figures 9, 10, 11:
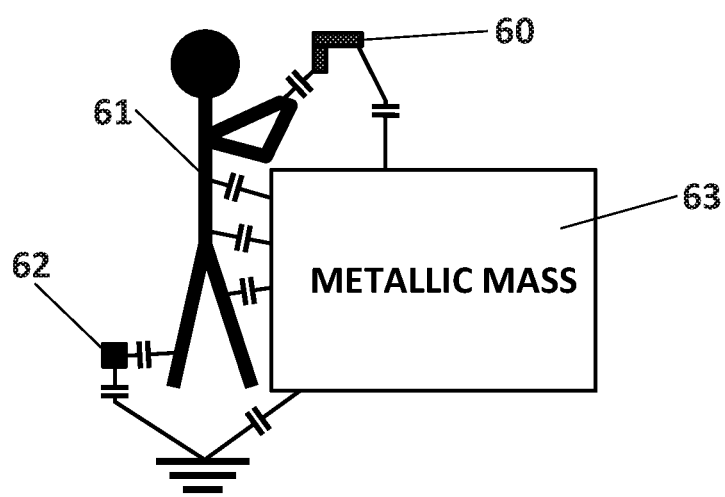
FIG. 9 depicts a table including two groups of three frequencies used to estimate the resonant frequency of the resonant circuit when it is amplifying the signal.
FIG. 10 depicts a table including intermediate and final results of the amplitude calculations corresponding to the two groups of frequencies and final estimated value of the frequency of the resonant circuit when it is amplifying the signal.
FIG. 11 is an example of an additional signal transmission path formed when the user approaches a metallic mass.

The intermediate and final results of the calculations corresponding to these two groups is summarized in the table of FIG. 10.

A final value of the estimated resonant frequency of the circuit when it is amplifying the signal generated by the microprocessor is then calculated simply as the mean between the two calculated frequency values.

Iterative calculation of the actual resonant frequency of the resonant circuit serves as well another advantageous purpose. As can be seen in FIG. 5 the resonant frequency of the resonant circuit changes when the body of the person approaches and finally touches or holds the object which, as said before, could be among numerous possibilities a weapon, a vehicle, a tool, a jewel, a medical instrument or a laboratory instrument.

It is therefore possible according to one embodiment of the invention to keep record of the estimated measured resonant frequency of the RLC circuit and according to the change and value of said frequency identify different scenarios such as:

a) The user does not hold the object which is electrically far from him, for example lying on a table. (Depicted in FIG. 5 between 0 and 50 units in the X time axis where 1 unit corresponds to 300 ms).

b) The user holds the object with one bare hand. (Depicted in FIG. 5 between 50 and 100 units in the X time axis where 1 unit corresponds to 300 ms).

c) The user holds the object with one hand wearing gloves. (Depicted in FIG. 5 between 100 and 150 in the X time axis where 1 unit corresponds to 300 ms).

One way of identifying the scenario for the safety system is in is to successively estimate the resonant frequency of the resonant circuit so that when the body of the person approaches the object varying the capacitance B2 between the body and said object said means compare the change in the estimated resonant frequency in a certain period of time, which may be a period of time which is preferably between 200 and 600 ms, more preferably around 350 ms due to the change of said capacitance and when said change exceeds a predetermined value and the estimated resonant frequency at that instant is within a certain range the safety system recognizes which possible scenario a, b, c or other possible scenarios such as that the person is holding the object with a dirty hand is actually taking place.

Different scenarios imply changes in impedances in the signal path. In circuits where signal generation and amplification does not change when impedance changes when the intensity of the signal is attenuated the correct scenario that is taking place may not be recognized.

One particular unfavorable scenario takes place when the user/person (61) holds the object (60) (a pistol) and wears, for example, a bracelet (62) including the transmitter in his ankle and is close to a metallic mass (63) of a certain size electrically connected to ground. This situation is depicted in FIG. 11. The body of the user/person (61) becomes capacitively coupled to the metallic mass (63). As a result of that an additional transmission path is defined which comprises the body of the person (61), the metallic mass (63), ground and the bracelet (62).

This additional capacitive transmission path weakens the signal transmitted along the main path. The intensity of the signal transmitted along the main capacitance path diminishes and may cause that the safety system does not recognize that the user is holding or proximate to the object because the signal intensity measured is, because of this unusual situation, lower than the intensity threshold.

Figure 12:
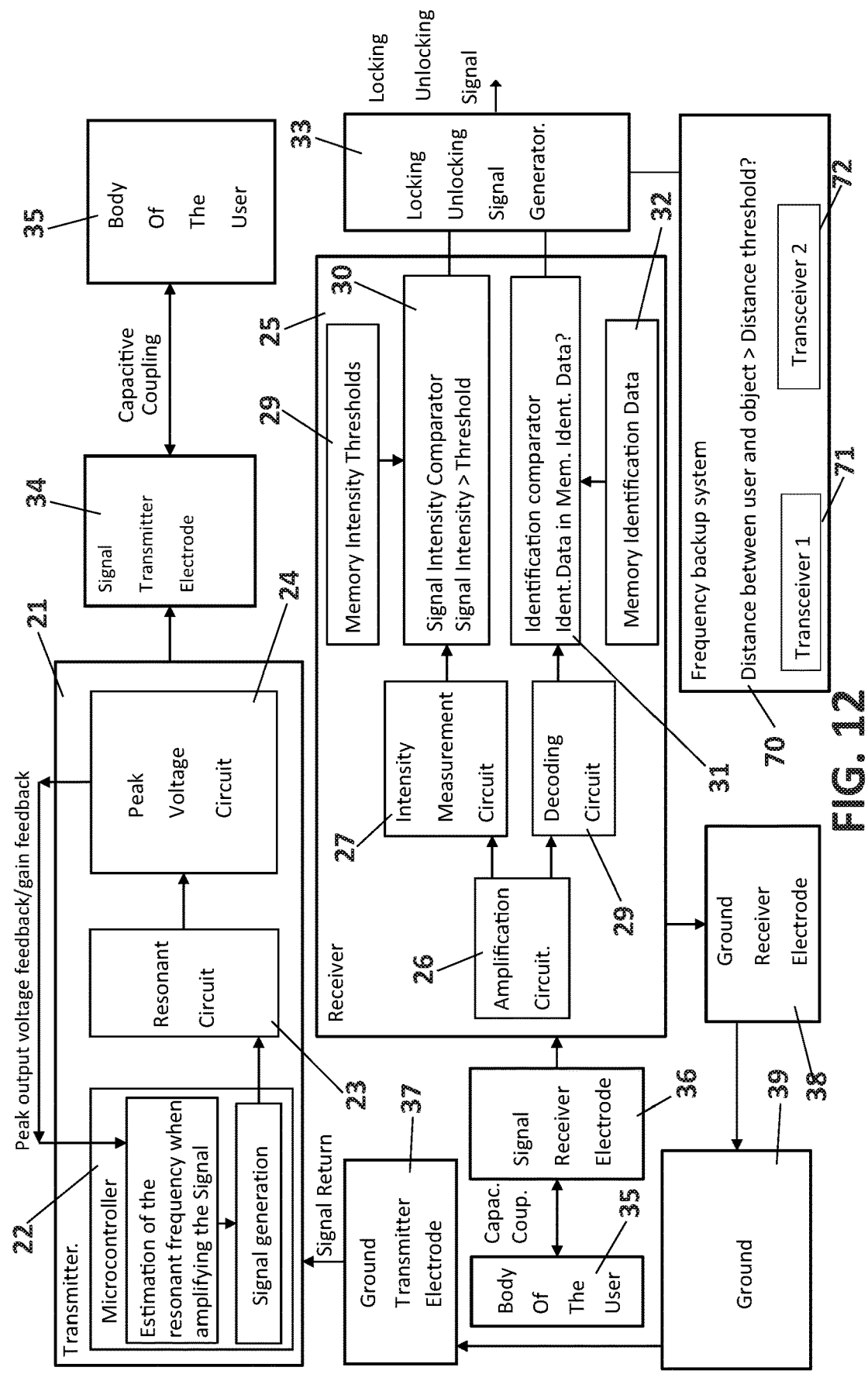
FIG. 12 illustrates a variation of the block diagram of FIG. 4 including a radiofrequency transceiver.

In order to solve this problem and to increase the accuracy of the safety system a radio frequency backup system (70) may be included. This backup system (70) includes two transceivers (71, 72). The interaction of these two transceivers (71, 72) with the rest of the capacitive circuit is depicted in FIG. 12.

One of these two transceivers (71) is worn by the user, for example is integrated in the bracelet, and works as initiator. The other one (72) is placed in the object and works as responder. One of the possible ways of calculating the distance between the transceivers (71,72) comprises the following steps. The initiator transceiver (71) emits a radio message and records the time, 't1', when this signal is sent. The receiver transceiver (72) receives the signal, takes a time to reply 'treply', and sends a radio message back to the initiator (71). The initiator (71) records the reception of the replied message a time 't2'. The time it takes for the message to travel from the initiator (71) to the responder (72), the time of flight, can be calculated according to the equation:

$$Tof=(t1-t2-treply)/2$$

The distance from the transceiver initiator (71) to the receiver transceiver (72) is then calculated multiplying the 'Tof' by the speed of the transmitted radio signal which when transmitted through the air approaches the speed of light.

According to this embodiment, the safety system including the backup system (70) would then check if the user/person is an authorized user and measure the amplitude of the transmitted identification signal. As in the general case, if the user is authorized and the amplitude is higher than the intensity threshold the system would unlock the object. If the user is authorized and the amplitude of the transmitted signal is lower than the amplitude threshold the system would then check by means of the two transceivers (71,72) if the distance between the user and the object, which may be a weapon, is lower than a certain distance. If it is the case the microcontroller, or the locking/unlocking signal generator would generate a signal to command the unlocking mechanism to unlock the weapon if the weapon was locked or would leave the weapon unlocked if the weapon was unlocked. If the signal intensity was lower than the set intensity threshold and the distance higher than the distance threshold the system would lock the weapon if the weapon was unlocked and leave the weapon locked if it was locked. The value of the distance to be used depends on the situation. If the priority is to make sure that no other user but the authorized user can use the weapon the distance is set to be very small in order to prevent that the weapon can be used by a person in proximity of the authorized user.

A further way of improving the security offered by the safety system, in particular in the case the object is a weapon is to incorporate means to detect that the user/person is holding the weapon. This means could be a switch, preferably a mechanical switch. In order to decide whether to unlock the weapon the system would first check if the user/person is holding the weapon using said means which may be a mechanical switch. If the switch is off and the weapon is unlocked the safety system would then lock the weapon. If the switch is off and the weapon is locked the safety system would not perform any operation. If the switch is on the system would then check if the user/person is authorized. If it is not the case and the weapon is unlocked the safety system would lock the weapon. If the user/person is authorized and the switch is on the safety system would then check if the intensity of the identification signal exceeds the intensity threshold. If it is the case the safety system would make sure that the weapon becomes unlocked or remains unlocked. If the switch is on the user is authorized and the intensity of the identification signal is below the intensity threshold the safety system the safety system would then check if the distance between the weapon and the user is below the defined distance. If it is not the case if the weapon is locked the safety system would not perform any action. If it is not the case and the weapon is unlocked the safety system would lock the weapon. On the contrary if the distance is below the defined distance the safety system would make sure that the state of weapon turns to be or remains unlocked so that the user/person can fire the weapon.

In most of the embodiments according to the invention (see FIGS. 4, 12) a signal is generated in order to lock or unlock the object when necessary. According to some embodiments falling under the scope of the present invention this signal is transmitted to means for locking/unlocking the object which in the case of a weapon, are means for locking/unlocking the firing mechanisms of said weapon. Such means are known in the art. The present invention is not restricted to certain particular means. As an example, these means may comprise an actuator having a coil through which a current may pass in order to create a magnetic field that moves a lock which can be a pin or a lever that interlocks with the firing mechanism of the weapon. As said other locking/unlocking means could be used together with the safety system of the present invention.

In this text, the terms first, second, third, etc. have been used herein to describe several devices, elements or parameters, it will be understood that the devices, elements or parameters should not be limited by these terms since the terms are only used to distinguish one device, element or parameter from another.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A safety system for an object comprising:
a transmitter comprising a microcontroller configured to generate an identification signal having a given frequency and a resonant circuit configured to amplify said identification signal, the transmitter being suitable to be placed in the vicinity of a body of a user to capacitively couple said identification signal to the body,
a receiver suitable to be capacitively coupled to said body and being configured to receive said identification signal and to recognize based on said identification signal if the user is an authorized user, and
a resonant frequency estimation means configured to estimate an actual resonant frequency of said resonant circuit when the resonant circuit is amplifying said identification signal and the microcontroller is adapted to choose, based on said estimated actual resonant frequency, as frequency for the identification signal the closest frequency to the estimated actual resonant frequency the microcontroller can generate so that the amplification of the identification signal is maximized;
wherein the safety system is configured to generate an unlocking signal in order to unlock the object when the object is locked and the receiver receives the identification signal and identifies the user as an authorized user based on one or both of: the received identification signal, and whether the intensity of the received identification signal exceeds a first signal intensity threshold;
wherein the safety system is configured to generate a locking signal in order to lock the object when the object is not locked and the receiver receives the identification signal and based on one or both of: said received identification signal the user is identified as a non-authorized user, and whether the intensity of the received identification signal is under a second signal intensity threshold; and
wherein the safety system is configured to adjust the first and second signal intensity thresholds according to one or both of: physical characteristics of the user, and presence of certain objects around the user.

2. The safety system according to claim 1, wherein said resonant frequency estimation means comprise a circuit that is configured to measure an amplitude of an output voltage of the resonant circuit.

3. The safety system according to claim 1, wherein the receiver comprises means to measure an intensity of the received identification signal and means to compare the measured intensity with a predefined intensity threshold.

4. The safety system according to claim 1,
wherein the microcontroller is configured to successively estimate the resonant frequency of the resonant circuit when it is amplifying the identification signal so that when the body of the user approaches the object varying a capacitance between the body and said object the safety system is adapted to measure a change in the estimated resonant frequency in a certain period of time due to the change of said capacitance and when said change exceeds a predetermined value and the estimated resonant frequency at that instant is within a certain range, the safety system is configured to recognize a possible capacitive signal transmission scenario that is taking place, said scenario being selected from the group comprising a scenario in which the user is not in physical contact with the object, a scenario in which the user is in contact with the object with his bare hands, or a scenario in which the user is holding the object wearing gloves.

5. The safety system according to claim 4, wherein the period of time is between 200 and 600 ms.

6. The safety system according to claim 4, wherein: the safety system is configured to generate an unlocking signal in order to unlock the object when the object is locked and the receiver receives the identification signal and identifies the user as an authorized user based on one or both of: the received identification signal, and whether the intensity of the received identification signal exceeds a first signal intensity threshold; the safety system is configured to generate a locking signal in order to lock the object when the object is not locked and the receiver receives the identification signal and based on one or both of: said received identification signal the user is identified as a non-authorized user, and whether the intensity of the received identification signal is under a second signal intensity threshold; and the safety system is configured to change the first and second signal intensity thresholds according to the different recognized capacitive signal transmission scenarios.

7. The safety system according to claim 1, wherein said object is selected from a group comprising: a weapon, a vehicle, a tool, a laboratory instrument or a piece of medical equipment.

8. The safety system according to claim 1, further comprising: a ground transmitter electrode suitable to be capacitively coupled to ground and connected to the transmitter, a signal transmitter electrode connected to the transmitter and suitable to be capacitively coupled to the body of the user in order to transmit said identification signal, a ground receiver electrode connected to the receiver and capacitively coupled to ground and a signal receiver electrode connected to the receiver and capacitively coupled to the body.

9. The safety system according to claim 8, wherein the signal transmitter electrode and the ground transmitter electrode are located in a holster assembly of a weapon.

10. The safety system according to claim 1, wherein the resonant circuit is configured to amplify the identification signal, wherein the microcontroller is configured to generate a carrier signal.

11. A method for controlling access to an object, the method comprising the steps of:
  i) estimating, by a resonant frequency estimation means, an actual resonant frequency of a resonant circuit when the resonant circuit is amplifying a first identification signal having a first frequency generated by a microcontroller;
  ii) choosing, by the microcontroller and based on said estimated actual resonant frequency, a second frequency for a second identification signal which is the closest frequency to the estimated actual resonant frequency the microcontroller can generate;
  iii) amplifying, by the resonant circuit, the second identification signal so that amplification is maximized and a second amplified identification signal is generated;
  iv) receiving, at a receiver, the second amplified identification signal, the second amplified identification signal being transmitted by capacitive coupling through a body of a user attempting to use the object; and
  v) determining, by the receiver, if the user is an authorized user based on the received second amplified identification signal;
  wherein the step of estimating the actual resonant frequency of the resonant circuit comprises the steps of:
    a) identifying a first set of frequencies among those the microcontroller can generate;
    b) ranking said frequencies according to their value;
    c) identifying, starting from the first one, every 'n' frequencies of said ranked frequencies;
    d) measuring a gain corresponding to each of said frequencies in the resonant circuit;
    e) identifying the frequency with the highest gain among the identified frequencies and recording said frequency value as hfv and its gain as hfg;
    f) assigning number 1 to the iteration counter 'm' such that m=1;
    g) identifying the frequencies situated at a distance $n_m=n/(2^m)$ of the ranked frequencies;
    h) measuring the gain corresponding to each of said frequencies in the resonant circuit;
    i) identifying the frequency with the highest gain among the identified frequencies and its corresponding frequency value, and recording said frequency value as hfv and its gain as hfg;
    j) checking if $n_m=1$ and if it is the case continuing with step m);
    k) adding 1 to the iteration counter 'm';
    l) Going back to step g);
    m) identifying a first group of 3 frequencies containing the frequency with the highest gain and the two frequencies close to it in the set of ranked frequencies;
    n) identifying a second group of 3 frequencies containing the frequency with the highest gain and the two frequencies among the ranked frequencies separated a distance two from the frequency with the highest gain;
    o) calculating the maximum of a polynomic curve of second order approaching the gain curve for each group by means of the formula $$Freq_{vertex} = \frac{f_1 + f_2}{2} - \frac{1}{2}\frac{a_2 - a_1}{2a_2 - a_1 - a_3}(f_3 - f_1)$$

where $f_1$, $f_2$ and $f_3$ are each of the frequencies of each group and $a_1$, $a_2$ and $a_3$ are the voltages corresponding to these frequencies; and
    p) calculating as final estimation of the resonant frequency value of the resonant circuit when it is amplifying the signal generated by the microprocessor the mean of the two frequencies calculated in step o).

12. The method according to claim 11, where 'n' is a power of 2.

* * * * *